United States Patent [19]
Huber

[11] Patent Number: 5,927,650
[45] Date of Patent: Jul. 27, 1999

[54] CONVERSION DEVICE FOR INSTALLATION IN AN AIRCRAFT DECK

[75] Inventor: Thomas Huber, Iffeldorf, Germany

[73] Assignee: Telair International GmbH, Hausham, Germany

[21] Appl. No.: 08/886,579

[22] Filed: Jul. 1, 1997

[51] Int. Cl.[6] .................................................. B64D 1/10
[52] U.S. Cl. ................... 244/118.1; 244/137.1; 193/35 R; 410/77; 410/92; 414/532
[58] Field of Search .............. 244/118.1, 137.1; 410/69, 77, 78, 79, 80; 198/782; 193/35 R; 414/529, 532, 533

[56] References Cited

U.S. PATENT DOCUMENTS

| | | | |
|---|---|---|---|
| 2,900,874 | 8/1959 | Tjossem . | |
| 2,975,676 | 3/1961 | Butler . | |
| 3,357,371 | 12/1967 | Gutridge | 105/366 |
| 3,507,226 | 4/1970 | Nadherny | 105/366 |
| 4,341,496 | 7/1982 | Carpenter et al. . | |
| 4,395,172 | 7/1983 | Hoener et al. | 244/137.3 |
| 4,700,186 | 10/1987 | Fujino et al. . | |
| 5,090,639 | 2/1992 | Miller | 244/118.1 |
| 5,199,288 | 4/1993 | Merilainen et al. . | |
| 5,388,788 | 2/1995 | Rudolph . | |
| 5,546,777 | 8/1996 | Liu et al. . | |

FOREIGN PATENT DOCUMENTS

| | | |
|---|---|---|
| 2315442 | 1/1977 | France . |
| 9530574 | 11/1995 | WIPO . |

*Primary Examiner*—Charles T. Jordan
*Assistant Examiner*—Tien Dinh
*Attorney, Agent, or Firm*—Howard & Howard

[57] ABSTRACT

A conversion device for installation in a recess of an aircraft deck, such that the installed device forms part of the aircraft deck for use in load securement or handling, comprises a turnable member with at least two functional faces. Each functional face comprises a different functional unit, such as active or passive roller units, locking devices, fixation rails, running surfaces or the other standard features. A rotational mounting is provided for the turnable member and is so constructed and so mounted in the recess that the turnable member is enclosed within the recess and can be locked in a position such that one of its functional faces forms at least part of the aircraft deck, i.e. faces upward. This arrangement enables rapid conversion of the deck so that it can be used for various purposes.

29 Claims, 4 Drawing Sheets

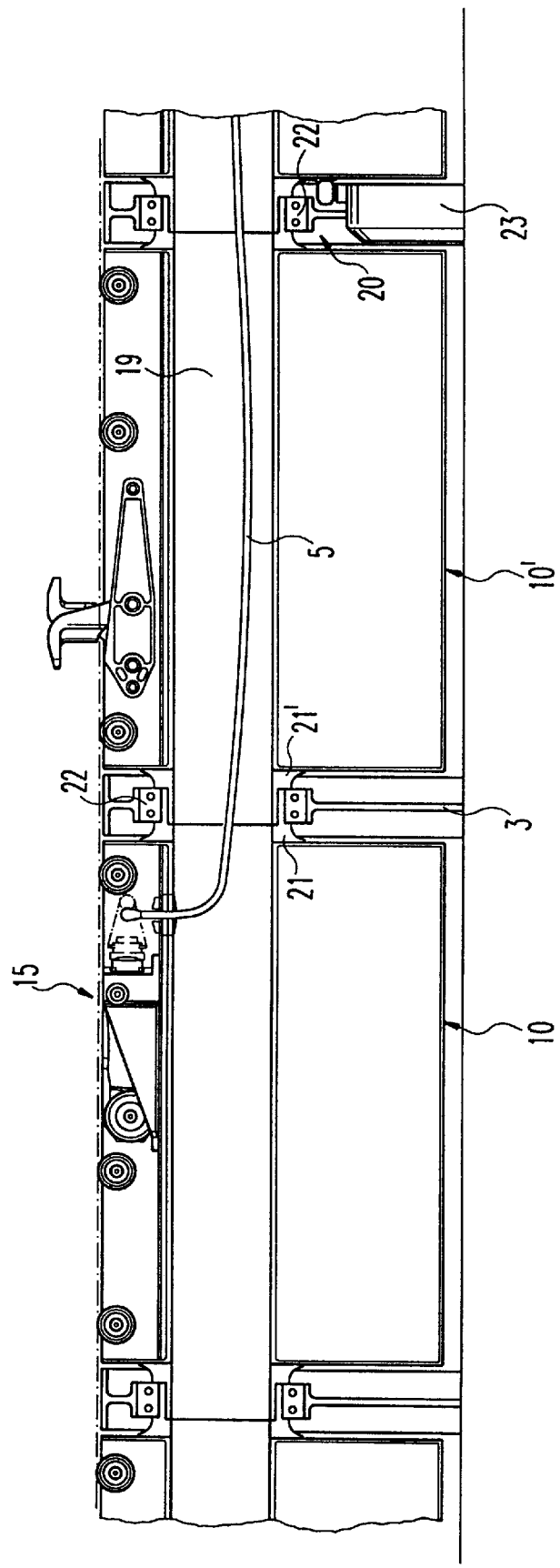

CONVERSION DEVICE FOR INSTALLATION IN AN AIRCRAFT DECK

FIELD OF THE INVENTION

The invention relates to a conversion device for installation in an aircraft deck, such that the installed device forms part of the aircraft deck for use in load securement or handling.

DESCRIPTION OF THE PRIOR ART

Aircraft are used to transport both freight and passengers. A given machine, for instance, can carry passengers by day and freight by night. Conversion from passenger to freight transport must therefore be achieved as quickly as possible. Still more extreme are the demands made on machines used for military purposes or for assistance in disasters. Here a given machine is used as a passenger carrier as well as to transport standardized containers or even vehicles. It is also conceivable for the different kinds of load to be carried simultaneously.

One known conversion system comprises pallet on which are permanently mounted passenger seats, such that the pallets can be fixed to a cargo deck. When the aircraft is to be used to transport freight, the pallets are removed, exposing the functional units customarily provided on a cargo deck, such as passive or power-driven roller units, latches or the like, so that pallets bearing freight can be installed instead of the pallets bearing passenger seats. Furthermore, it is customary to dispose fixation rails in the aircraft deck, on which either passenger seats or the above-mentioned functional units can be mounted. Both systems are relatively time-consuming in use. For employment in machines for military purposes or disaster relief, which must also accommodate vehicles, neither system is very suitable.

The object of the present invention is to provide a device for installation in an aircraft deck which will enable the deck to be simply and rapidly converted so as to allow variable use of the aircraft deck.

SUMMARY OF THE INVENTION

According to the present invention there is provided a conversion device for installation in a recess defined in an aircraft deck, comprising a turnable member defining at least two functional faces, each functional face comprising different functional units for use in load handling or securement, a rotational mounting for the turnable member which mounts the turnable member such that in use the turnable body is contained within the recess and can be locked in a position wherein a chosen one of its functional faces will form at least part of the aircraft deck.

It will be appreciated that by means of the invention different functional units need not be installed and removed in the aircraft deck but rather are permanently present in the deck. Only a few operations are required to convert an entire aircraft deck from one kind of use to the other.

Preferably, sealing mechanisms are provided to seal a space defined between the aircraft deck and the turnable member when one of its functional faces is in an upward-facing position in which it forms part of the aircraft deck. This feature ensures long-term functionality of the turnable members.

Preferably also, the rotational mounting is so constructed that the turnable member is disposed so as to be rotatable about an axis but otherwise remains fixed within the recess. Advantageously, the turnable members are rotatably mounted in holders but apart from this, however, the turnable members are fixedly disposed in a recess in the deck so that they cannot be displaced in any direction. Such a mounting can be very simply achieved and ensures that securement device or power-driven roller units can sustain large horizontal or vertical forces.

In a preferred embodiment of the invention each of the rotational mountings comprises a drive motor, preferably remote-controlled, so that at the press of a button the turnable body can be brought from one of its positions into another. Rotational mountings are further provided with preferably remote-controlled locking means to lock the turnable members to the aircraft deck, which increases stability in a simple way inasmuch as not all impinging forces need to be absorbed by the bearings of the turnable members. These locking means can additionally be provided in the drive motor. The drive motor can also be equipped with a self-locking gear train, which secures the fixation.

Each rotational mounting preferably defines a channel so constructed, with an opening facing toward the turnable body, that controlling and supply cables can be introduced from outside through the rotational mounting to corresponding functional units within the turnable member, e.g. a roller drive unit. The rotational mountings are further preferably constructed in such a way that turnable members can be mounted in a row in the aircraft deck so that they are practically in contact with one another. In this way, if the turnable members comprise hollow extruded profiles, the rotational mountings and the hollow turnable members together form a channel for the installation of electrical or hydraulic conduits.

BRIEF DESCRIPTION OF THE DRAWING

A preferred embodiment of the invention will now be described with reference to the accompanying drawings, in which:

FIG. 4 is a partial longitudinal section through two adjacent conversion devices.

DESCRIPTION OF THE PREFERRED EMBODIMENTS

Figure 1:
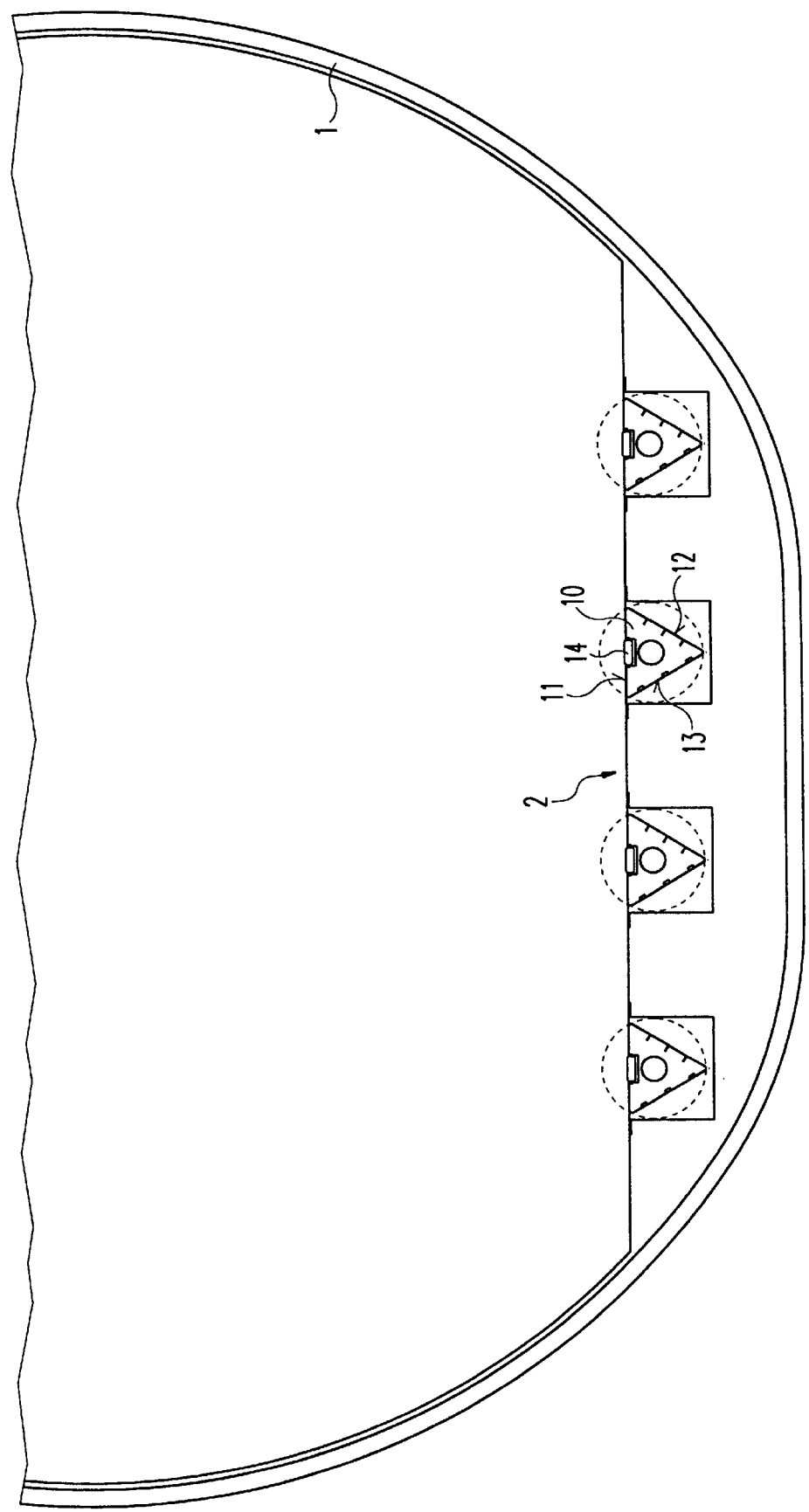
FIG. 1 is a schematic partial cross section through the fuselage of an aircraft.

In the following description, identical reference numerals are used for identical parts or parts with identical function.

FIG. 1 is a highly schematic drawing, with parts not drawn to scale in order to clarify the features of interest, of a cross section through a fuselage 1 of an aircraft, in the lower region of which is a deck 2. Within the deck 2 are mounted, in side-by-side rows, conversion devices comprising turnable members 10 with (in this exemplary embodiment) triangular cross section. The turnable members 10 comprise first to third functional faces 11 to 13, corresponding to their triangular cross section. The three functional faces differ in their construction, as is particularly evident in FIG. 3. Here it can be seen that on the first functional face 11 of the turnable member 10 installed in the aircraft deck 2, conveyor rollers 14 are mounted, whereas the second functional face 12 has a smooth running face 18, over which objects can move. The third functional face 13 is provided with fixation rails 17 by means of which other functional units can be installed, e.g. passenger seat or tie-down or locking elements or devices.

Figure 2:
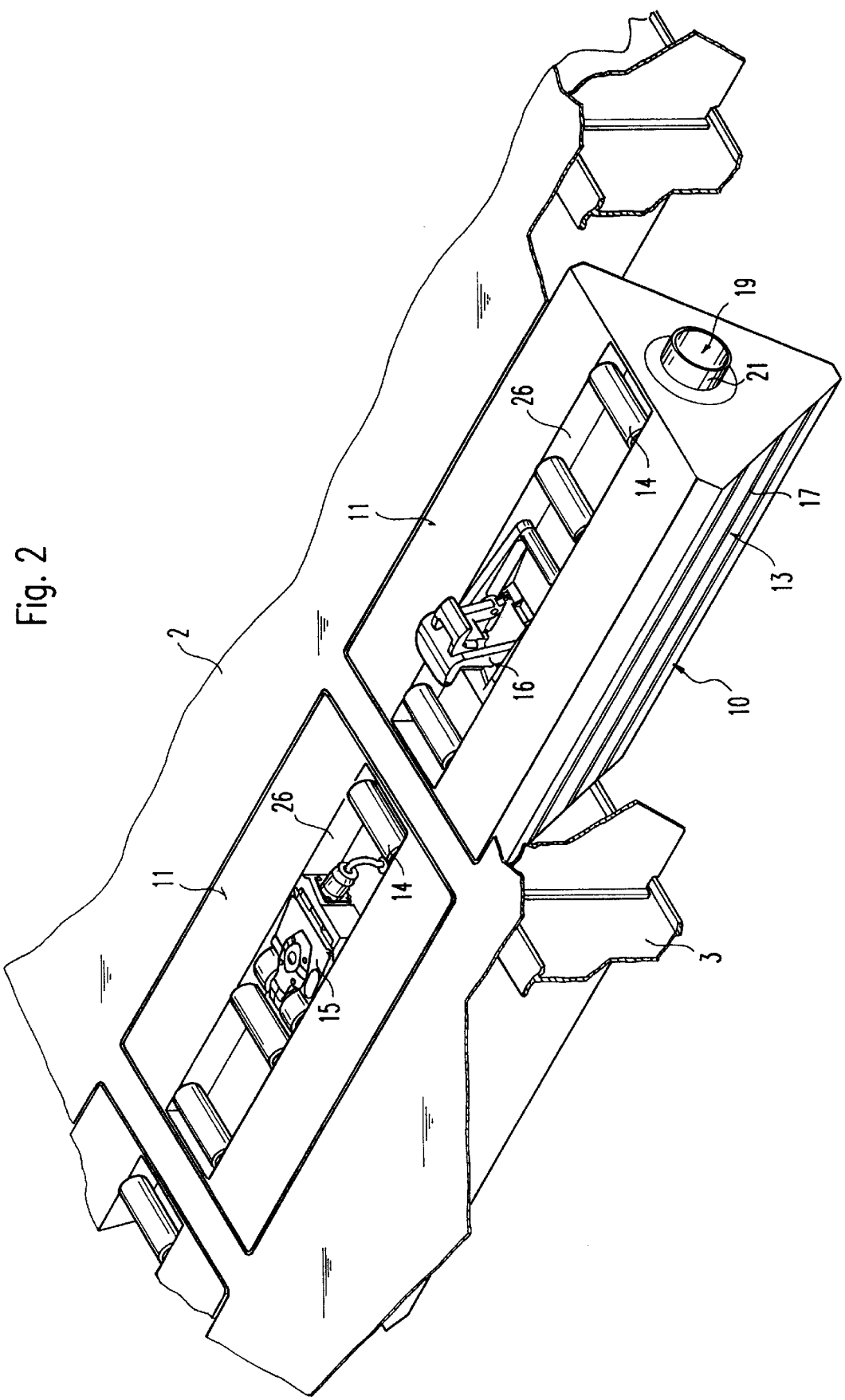
FIG. 2 is a perspective view of part of a deck of the aircraft shown in FIG. 1.

As can be seen in FIG. 2, the first functional faces 11 are preferably provided with a channel 26 such as is generally known for aircraft decks. In this channel 26 can be disposed a latch 16 with (passive) conveyor rollers 14 arranged ahead of and behind it, or a roller drive unit 15 with associated conveyor rollers 14, as shown in FIG. 2. It is of course also possible to provide only such conveyor rollers 14 in the channel 26.

The turnable members 10, as shown more clearly in FIG. 4, are provided at their ends with extensions 21, 21', which are held in bearings 22 mounted in ribs 3 of the deck 2. Together with the bearings 22, the extensions 21, 21' form rotational mountings 20, by means of which the turnable members 10 can be rotated. In addition, as shown in FIG. 4, a torsion motor 23 is provided to rotate the turnable member 10, which in addition comprises locking means to retain the turnable member 10 in whichever position is desired at any time. The bearing extensions 21, 21' are tubular in configuration, with an internal channel 19 that continues within the turnable member 10 so that control leads 5 can be passed through in order to control or supply energy to a unit such as a roller drive unit 15. In the embodiment of the invention shown here, the extensions 21, 21' are so constructed that for each set of adjacent turnable members, the extension 21 of the first turnable member 10 receives the directly adjacent extension 21' of the second turnable member 10'; as a result, a single bearing 22 suffices to support two turnable members on one side of each, as shown in FIG. 4.

Figure 3:
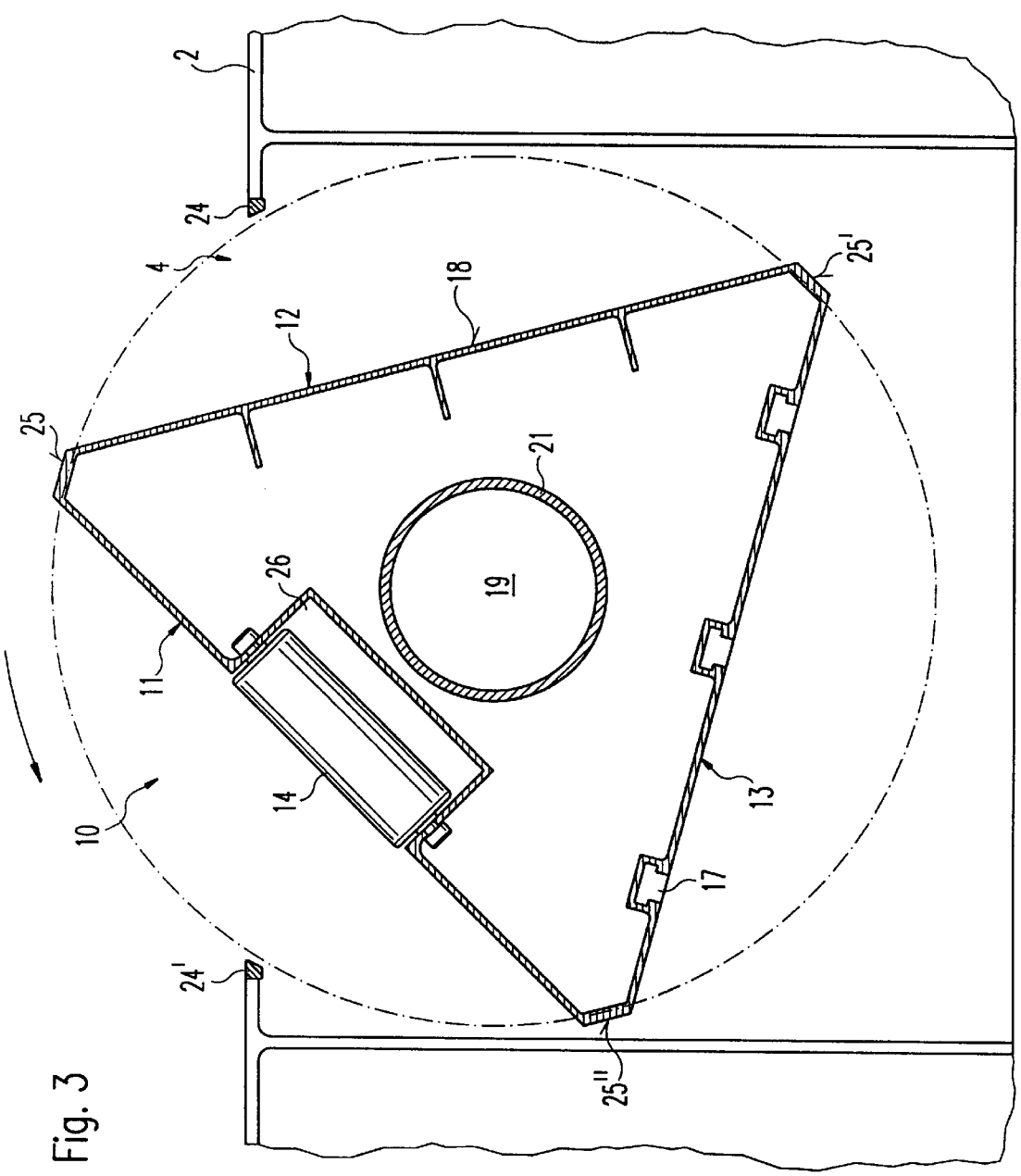
FIG. 3 is a schematic cross section through a conversion device installed in the deck during turning of the device from one functional face to another.

When the turnable members 10 are to be turned from one position into another, as indicated in FIG. 3, they are rotated about their long axis. When they have reached the final position, sealing surfaces 25, 25', 25" engage elastically constructed sealing lips 24, 24' seated on the long edges of the recesses 4 within which the turnable members 10 are situated.

In the above description only turnable members with a triangular cross section have been described. It is of course also possible, if desired, to construct to construct turnable members with only two or with more than three functional faces.

What is claimed is:

1. A conversion device for installation in a recess defined in an aircraft essentially planer deck, comprising:
    a turnable member defining at least two essentially functional and planer faces;
    each of said planer faces presenting a unique functional unit for use in load handling or securement; and
    a rotational mounting for rotatably supporting said turnable member on an axis central to said faces and within a recess in an aircraft deck and for maintaining said turnable member in an operative position wherein a selective one of said functional faces forms at least a part of the essentially planer aircraft deck.

2. A device as set forth in claim 1, wherein said turnable member includes a sealing mechanism for establishing a peripheral seal against the aircraft deck when one of said functional faces is in said operative position.

3. A device a set forth in claim 1, wherein said rotational mounting includes a stationary axis of rotation upon which said turnable member is journaled.

4. A device as set forth in claim 1, wherein said rotational mounting includes a drive motor for controlling rotation of said turnable member.

5. A device a set forth in claim 4, wherein said drive motor includes a self-locking gear train remote-controlled lock to secure said turnable member in position with respect to the aircraft deck.

6. A device as set forth in claim 1, wherein said rotational mounting includes a remote-controlled lock to secure said turnable member in position with respect to the aircraft deck.

7. A device as set forth in claim 1, wherein said rotational mounting defines a channel having an opening in a direction facing toward said turnable member.

8. A device as set forth in claim 1, wherein at least one of said functional faces defines a receptacle for receiving a plurality of functional units.

9. A device as set forth in claim 1, wherein said turnable member comprises an extruded profile.

10. A device as set forth in claim 1, wherein said unique functional units comprise at least one of an active roller unit, a passive roller unit, a locking device, a fixation rail, and a running surface.

11. An aircraft for transporting various types of cargo comprising:
    a fuselage having an extended length and defining a generally hollow interior region;
    a deck supported in a generally horizontal plane within said fuselage, said deck having an upper load carrying surface including a recess formed therein;
    a rotational mounting fixedly disposed within said recess of said deck; and
    a turnable member rotatably supported within said rotational mounting and having at least two planar functional faces, each of said functional faces presenting a unique functional unit for use in load handling or securement, wherein said turnable member is rotated about an axis central to said faces into and maintained in an operative position with a selective one of said functional planer faces forming a part of said upper load carrying surface of said deck.

12. An aircraft as set forth in claim 11 further including a sealing mechanism for establishing a peripheral seal between one of said functional faces and said deck when said one functional face is in said operative position.

13. An aircraft as set forth in claim 11 wherein said rotational mounting includes a drive motor for controlling rotation of said turnable member.

14. An aircraft as set forth in claim 11 wherein said rotational mounting includes a remote-controlled lock to secure said turnable member in said respective operative positions with respect to the aircraft deck.

15. An aircraft as set forth in claim 11 wherein said drive motor includes a self-locking gear train to secure said turnable member in position with respect to the aircraft deck.

16. An aircraft as set forth in claim 11 wherein said rotational mounting defines a channel opening in a direction facing toward said turnable member.

17. An aircraft as set forth in claim 11 wherein said unique functional units comprise at least one of an active roller unit, a passive roller unit, a locking device, a fixation rail, and a running surface.

18. A method of converting an aircraft deck between multiple load carrying uses comprising the steps of:
    forming a recess in the upper load carrying surface of an aircraft deck;
    rotatably supporting a turnable member having at least two functional and planer faces within the recess, each functional face presenting a unique functional unit for use in load handling or securement;

rotating the turnable member about an axis central to the faces into an operative position with a selective one of the functional and planer faces forming a part of said upper load carrying surface of said deck.

19. A method as set forth in claim 17 further including the step of establishing a seal between each functional face and the deck when in the operative position.

20. A method as set forth in claim 17 further including the step of securing the turnable member in an operative position with respect to the aircraft deck.

21. A conversion device for installation in a recess in a planer aircraft deck and comprising;

a turnable member presenting at least two planer faces;

a rotational mounting for rotationally supporting said turnable member for rotation about an axis central to said two faces below the planer aircraft deck to selectively rotate one of said faces into planer alignment with said planer aircraft deck.

22. A device as set forth in claim 21 wherein said turnable member is triangular in cross section to present three of said faces, said rotational mounting being disposed on an axis centrally of said triangular cross section.

23. A device ass forth in claim 22 wherein each of said faces presents a different function.

24. A device as set forth in claim 23 in combination with:

a deck for an aircraft presenting an upper load carrying surface, said deck presenting a plurality of recesses therein, one of said turnable members disposed in each of said recesses.

25. The combination set forth in claim 24 wherein said recesses and said turnable members are axially aligned in end to end relationship with one another to define a row of said turnable members.

26. The combination as set forth in claim 25 including a plurality of said rows.

27. A method of converting an aircraft deck between multiple load carrying functions comprising the steps of:

disposing a turnable member having multiple faces each with a different cargo function in a recess in the deck, supporting the turnable member on an axis central to the multiple faces, and the rotating turnable member about the axis to selectively rotate one of the faces into alignment with the deck disposing a plurality of the turnable members in the deck and rotating all of the turnable members to present like faces in alignment with the deck.

28. A method as set forth in claim 27 further defined as disposing the turnable members in an axially aligned row.

29. A method as set forth in claim 28 further defined as disposing the turnable members in a plurality of rows.

* * * * *